US010346369B2

(12) United States Patent
Ahrens et al.

(10) Patent No.: US 10,346,369 B2
(45) Date of Patent: Jul. 9, 2019

(54) RETRIEVING POINT-IN-TIME COPIES OF A SOURCE DATABASE FOR CREATING VIRTUAL DATABASES (71) Applicant: Delphix Corp., Menlo Park, CA (US)

(72) Inventors: Matthew Allen Ahrens, San Francisco, CA (US); Subhadeep Sinha, Mountain View, CA (US); George Raymond Wilson, Cumming, GA (US); Jeffrey Karr Biseda, San Francisco, CA (US)

(73) Assignee: DELPHIX CORP., Redwood City, CA (US)

( * ) Notice: Subject to any disclaimer, the term of this patent is extended or adjusted under 35 U.S.C. 154(b) by 0 days.

(21) Appl. No.: 13/799,644

(22) Filed: Mar. 13, 2013

(65) Prior Publication Data

US 2014/0108348 A1 Apr. 17, 2014

Related U.S. Application Data (60) Provisional application No. 61/712,765, filed on Oct. 11, 2012.

(51) Int. Cl.
*G06F 16/21* (2019.01)
*G06F 16/178* (2019.01)
(Continued)

(52) U.S. Cl.
CPC .............. *G06F 16/21* (2019.01); *G06F 3/065* (2013.01); *G06F 11/1446* (2013.01);
(Continued)

(58) Field of Classification Search
CPC .................. G06F 17/30067; G06F 2201/84
(Continued)

(56) References Cited

U.S. PATENT DOCUMENTS 5,781,912 A * 7/1998 Demers et al. ............... 707/634
5,819,292 A   10/1998 Hitz et al.
(Continued)

FOREIGN PATENT DOCUMENTS

JP         2005532611 A    10/2005
WO    WO 2005/111867 A2   11/2005

OTHER PUBLICATIONS

"FlexVol™ abd FlexClone™ Software," Datasheet, Network Appliance, Inc., 2004, 2 Pages.
(Continued)

*Primary Examiner* — Hicham Skhoun
(74) *Attorney, Agent, or Firm* — Fenwick & West LLP (57) ABSTRACT A storage system maintains copies of a source database to allow virtual databases to be provisioned. Transaction logs received from the source database are applied to database blocks stored in the storage system to update the database blocks. The storage system checks if there are defect in the transaction logs of the source database. If a defect in transaction logs is detected, the storage system obtains a latest copy of the source database. The storage system matches database blocks of the received copy with database blocks already available in the storage system to determine whether a corresponding database block is already available in the storage system. If a received database block is different from database blocks already available at the storage system, the received database block is stored in the storage system. The database blocks may be matched using a hash value of the database blocks.

16 Claims, 5 Drawing Sheets (51) Int. Cl.
    *G06F 16/27* (2019.01)
    *G06F 3/06* (2006.01)
    *G06F 11/14* (2006.01)

(52) U.S. Cl.
    CPC ...... *G06F 11/1451* (2013.01); *G06F 11/1456* (2013.01); *G06F 16/178* (2019.01); *G06F 16/273* (2019.01); *G06F 11/1471* (2013.01); *G06F 2201/80* (2013.01); *G06F 2201/815* (2013.01); *G06F 2201/84* (2013.01)

(58) Field of Classification Search
    USPC .......................................................... 707/639
    See application file for complete search history.

(56) References Cited

U.S. PATENT DOCUMENTS

| | | | |
|---|---|---|---|
| 5,838,923 A * | 11/1998 | Lee et al. | 709/236 |
| 6,192,365 B1 | 2/2001 | Draper et al. | |
| 6,651,077 B1 | 11/2003 | East et al. | |
| 7,107,385 B2 | 9/2006 | Rajan et al. | |
| 7,225,204 B2 | 5/2007 | Manley et al. | |
| 7,334,094 B2 | 2/2008 | Fair | |
| 7,334,095 B1 | 2/2008 | Fair et al. | |
| 7,340,461 B2 | 3/2008 | Vishlitzky et al. | |
| 7,373,364 B1 | 5/2008 | Chapman | |
| 7,386,695 B2 | 6/2008 | Fuente | |
| 7,409,511 B2 | 8/2008 | Edwards et al. | |
| 7,457,829 B2 * | 11/2008 | East et al. | |
| 7,457,982 B2 | 11/2008 | Rajan | |
| 7,539,836 B1 | 5/2009 | Klinkner | |
| 7,587,563 B1 | 9/2009 | Teterin et al. | |
| 7,590,660 B1 | 9/2009 | Richards et al. | |
| 7,631,021 B2 | 12/2009 | Sarma et al. | |
| 7,707,184 B1 | 4/2010 | Zhang et al. | |
| 7,743,035 B2 | 6/2010 | Chen et al. | |
| 7,757,056 B1 | 7/2010 | Fair | |
| 7,822,758 B1 | 10/2010 | Prakash et al. | |
| 7,827,366 B1 | 11/2010 | Nadathur et al. | |
| 7,856,424 B2 | 12/2010 | Cisler et al. | |
| 7,877,357 B1 | 1/2011 | Wu et al. | |
| 7,937,547 B2 | 5/2011 | Liu et al. | |
| 7,941,470 B2 | 5/2011 | Le et al. | |
| 7,996,636 B1 | 8/2011 | Prakash et al. | |
| 8,037,032 B2 | 10/2011 | Pershin et al. | |
| 8,150,808 B2 * | 4/2012 | Zha et al. | 707/639 |
| 8,280,858 B2 | 10/2012 | Ahrens et al. | |
| 8,296,755 B2 * | 10/2012 | Srinivasa et al. | 717/171 |
| 8,311,988 B2 | 11/2012 | Cisler et al. | |
| 8,532,973 B1 | 9/2013 | CaraDonna et al. | |
| 8,595,191 B2 * | 11/2013 | Prahlad et al. | 707/654 |
| 8,775,663 B1 | 7/2014 | Singh | |
| 2002/0083037 A1 | 6/2002 | Lewis et al. | |
| 2002/0152422 A1 * | 10/2002 | Sharma et al. | 714/13 |
| 2004/0019823 A1 * | 1/2004 | Gere | G06F 11/1433 714/13 |
| 2004/0267835 A1 | 12/2004 | Zwilling et al. | |
| 2005/0086241 A1 * | 4/2005 | Ram et al. | 707/100 |
| 2005/0111867 A1 | 5/2005 | Hatano | |
| 2005/0262097 A1 | 11/2005 | Sim-Tang et al. | |
| 2007/0038682 A1 | 2/2007 | Kulesza et al. | |
| 2008/0307345 A1 | 12/2008 | Hart et al. | |
| 2009/0172201 A1 * | 7/2009 | Carmel | 709/248 |
| 2009/0222496 A1 | 9/2009 | Liu et al. | |
| 2010/0198791 A1 | 8/2010 | Wu et al. | |
| 2010/0205672 A1 | 8/2010 | Milliken et al. | |
| 2011/0093436 A1 | 4/2011 | Zha et al. | |
| 2012/0084252 A1 | 4/2012 | Zha et al. | |
| 2012/0089570 A1 | 4/2012 | Zha et al. | |
| 2012/0311376 A1 | 12/2012 | Taranov et al. | |

OTHER PUBLICATIONS

"FlexClone" Datasheet, Network Appliance, Inc., 2008, 2 Pages.
"NetApp SnapMirror," Datasheet, Network Appliance, Inc., 2008, 2 Pages.
"NetApp Snapshot Technology," Datasheet, Network Appliance, Inc., 2004, 1 Page.
"NetApp SnapManager for Oracle," Datasheet, Network Appliance, Inc., 2008, 2 Pages.
Meeks, J., "An Oracle Technical White Paper—Oracle Data Guard with Oracle Database 11g Release 2," Oracle, Sep. 2009, 20 Pages.
Actifio, "Refining Oracle Database Management," White Paper, Feb. 2012, 13 Pages.
Choinski, V., "Lab Validation Report: Actifio's Protection and Availability Storage Platform," Enterprise Strategy Group, Feb. 2012, 19 Pages.
Corrigan, P., "Actifio: Protection and Availability Storage," Storage Strategies, Snapshot Report, Oct. 2011, 3 Pages.
Boppana, U., "Using FlexClone to Clone Files and LUNs," NetApp Technical Report, Mar. 2010, 32 Pages.
Creek, T., "Applications for Writeable LUNs and LUN Cloning in Oracle Environments," NetApp, Technical Report, Jun. 2003, 10 Pages.
Degwekar, A., "Using SnapMirror with SnapDrive for UNIX," NetApp Technical Report, 2007, 11 Pages.
GMANE, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.
GMANE, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.
GMANE, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.
GMANE, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.
GMANE, Discussion regarding "ZFS snapshot improvement," From the zfs-discuss@opensolaris.org mailing list, May 10, 2006, 1 Page, Can be retrieved at <URL:http://article.gmane.org/gmane.os.solaris.openolaris.zfs/232/match=snapshot>.
GMANE, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.
Higgins, B., et al., "Backup and Recovery Snap Manager for SQL Server," DLA PIPER, Nov. 2008, 37 Pages.
Hitz, D., et al., "File System Design for an NFS File Server Appliance," Technical Report, USENIX, Winter 1994, 23 Pages.
Jackson, J., "ZFS: The future for storage networks?; File system has massive capacity, but licensing issues and architectural concerns persist," Government Computer News, Media, Inc., Jun. 25, 2007, 2 Pages.
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.
Lal, J., et al., "DB2: Cloning a Database using NetApp FlexClone Technology," NetApp, Apr. 30, 2006, 60 Pages.
Merrill, J., et al., "SnapVault Best Pratices Guide," NetApp Technical Report, 2008, 29 Pages.
Nadgir, N., "Databases and ZFS," Oracle Blog, Sep. 25, 2006, 8 Pages, Can be retrieved from <URL:https://blog.oracle.com/realneel/entry/zfs_and_databases>.
Network Appliance, Inc., "Data ONTAP 7.2 Commands: Manual Page Reference, vol. 1," May 16, 2008, 615 Pages.
Network Appliance, Inc., "NetApp Data Management for Decision Support Systems," 2005-2010, 4 Pages.

(56) References Cited

OTHER PUBLICATIONS

Network Appliance, Inc., "Flexvol and Flexclone Software," 2006, 2 Pages.
Network Appliance, Inc., "SnapManager 3.0 for Oracle Installation and Administration Guide," Nov. 2008, 294 Pages.
Network Appliance, Inc., "SnapManager 2.2 for Oracle Installation and Administration Guide," Nov. 2007, 310 Pages.
Network Appliance, Inc., "SnapManager 5.0 for Microsoft SQL Server Installation and Administration Guide," Oct. 2008, 492 Pages.
Network Appliance, Inc., "Network Appliance Snapmirror Software," 2006, 2 Pages.
Oracle, "Oracle Database Backup and Recovery User's Guide," 11g Release 1(11.1), Aug. 2008, 598 Pages.
Osuna, A., "An Introduction to FlexClone Volumes" Redbooks, IBM, 2006, 50 Pages.
Osuna, A., "Using IBM DB2 UDB with IBM System Storage N series" Redbooks, IBM, Dec. 2006, 136 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.
Schuettinger, S., "NetApp Technical Report—Rapid Deployment of Oracle Database 11g Using VMWare Infrastructure and NetApp Flexclone," NetApp, Jan. 2008, 24 Pages.
Schuettinger, S., "Helping DBAs Become More Efficient NetApp Efficiency and Manageability Advantages," NetApp White Paper, Jul. 2009, 12 Pages.
Sun Microsystems, Inc., "ZFS the File System of the Future," 19 Pages. [Publication date is unknown].
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," PAUL's Blog 3.0 (Release Candidate), Oracle, 2007, 5 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage SAN Volume Controller Software V4.3.0 introduces space-efficient VDisks and VDisk mirroring," IBM United States Announcement 208-114, May 13, 2008, 17 Pages.
Microsoft, "Microsoft Developer's Network, Pages and Extents," Microsoft Corporation ("Pages and Extents") Sep. 2007, 2 Pages.
Mullins, "Excerpts of DB2 Developer's Guide, Fifth Ed." May 2004, 5 Pages.
NetApp, 2007 NetApp, Inc., Data ONTAP 7.1 Data Protection Online Backup and Recovery Guide, NetApp Technical Doc, Jan. 12, 2007, pp. 508.

NetApp, "Datasheet FlexClone," NetApp Technical Doc, 2008, 2 Pages.
NetApp, "Datasheet FlexVol™ and FlexClone™ Software," NetApp Technical Doc, 2004, 2 Pages.
NetApp, "Datasheet Netapp SnapManager for Oracle," NetApp Technical Doc, 2008, 2 Pages.
NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS The File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.
PCT International Search Report and Written Opinion for PCT/US2013/064389, dated Apr. 21, 2014, 15 Pages.

(56) References Cited

OTHER PUBLICATIONS

Sadagopan, P., et al., "Oracle Fusion Middleware DR Solution Using NetApp Storage," NetApp Technical Report, May 2008, 38 Pages.
Notice of Grounds for Rejection for Japanese Patent Application No. P2014-155597, dated Apr. 21, 2015, 5 Pages.
Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Office Action for Canadian Patent Application No. CA 2,885,059, dated May 31, 2016, 4 Pages.
Supplementary European Search Report for European Patent Application No. E 13844661, dated Jun. 21, 2016, 10 Pages.
Gray, J., et al., "Transaction Manager Structure, Chapter 11," Transaction Processing Concepts and Techniques, In: The Morgan Kaufmann series in data management systems, Jan. 1, 1993, pp. 585-628.
Gray, J., et al., "Advanced Transaction Manager Topics, Chapter 12," Transaction Processing: Concepts and Techniques, In: The Morgan Kaufmann series in data management systems, Jan. 1, 1993, pp. 630-657.
Meister, D., et al., "Multi-Level Comparison of Data Deduplication in a Backup Scenario," Systor'09, May 4-6, 2009, pp. 1-12.
Wikipedia, "Data Deduplication," Oct. 9, 2012, 7 Pages, [online] [retrieved on Jul. 6, 2016] Retrieved from the internet <URL:https://en.wikipedia.org/w/index.php?title=Data deduplication&oldid=516862852>.
Verhofstad, J., "Recover Techniques for Database Systems," Computing Surveys, ACM, Jun. 1978, pp. 167-195, vol. 10, No. 2.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, Case IPR2015-00108, U.S. Pat. No. 8,566,361 B2, May 11, 2016, 57 Pages.
Office Action for Canadian Patent Application No. CA-2,885,059, dated Apr. 28, 2017, 5 Pages.
Examination report No. 1 for Australian Patent Application No. AU 2013329188, dated May 3, 2018, 3 Pages.
Communication pursuant to Article 94(3) EPC for European Patent Application No. EP 13844661.2, dated Jan. 12, 2018, 7 Pages.
Office Action for Canadian Patent Application No. CA 2,885,059, dated Apr. 30, 2018, 5 Pages.

\* cited by examiner

RETRIEVING POINT-IN-TIME COPIES OF A SOURCE DATABASE FOR CREATING VIRTUAL DATABASES

CROSS REFERENCE TO RELATED APPLICATION

This application claims the benefit of U.S. Provisional Patent Application 61/712,765, entitled "Retrieving Point-in-time Copies for Creating Virtual Databases," filed on Oct. 11, 2012, which is incorporated by reference in its entirety.

BACKGROUND

This invention relates generally to databases, and in particular to efficient retrieval of point-in-time copies from a source database for creating virtual databases.

Databases store data that is critical to an organization and thus form an important part of an organization's information technology infrastructure. As the information available in an organization grows, so does the complexity of the infrastructure required to manage the databases that store the information. The increased complexity of the infrastructure increases the resources required to manage the databases and the applications that depend on the databases. These increased costs may include the costs associated with hardware for managing the databases as well as the costs associated with additional personnel needed to maintain the hardware. The increased complexity of the infrastructure also affects the maintenance operations associated with the databases, for example, causing backup and recovery operations to take significantly longer.

In a typical organization's infrastructure environment, production database servers run applications that manage the day-to-day transactions of the organization. Changes to production databases or to applications that depend on the production databases are tested on copies of the databases to protect the production environment. Copies of the production databases may be required for several stages in the lifecycles of workflows associated with the production database and applications that depend on the production databases. For example, the stages in the lifecycle of a change incorporated in a production database may include a development stage, a tuning stage, a testing stage, a quality assurance stage, a certification stage, a training stage, and a staging stage. Making copies of the production databases for each stage requires redundant and expensive hardware infrastructure as well as the time overhead required to copy the data, which may take significant amount of time.

SUMMARY

To address the needs unmet by existing database technologies, embodiments of the invention maintain copies of a source database on a storage system so as to allow provisioning virtual databases based on the copy of the source database. Each copy of the source database may include multiple database blocks, and each database block may be associated with multiple copies of the source database. The storage system receives transaction logs from the source database. The storage system determines whether there are any defects in the transaction logs. If there are no defects in the transaction logs, the storage system applies the received transaction logs to database blocks of the source database stored in the storage system. If the storage system detects a defect in the transaction logs, the storage system receives a latest copy of data from the source database. For each database block received in the latest copy, the storage system determines whether the database block of the latest copy matches a corresponding database block of a previously stored copy. If the storage system determines that a database block does not match the previously stored copy, the storage system stores the database block. The storage system creates a snapshot representing a copy of the source database at a point in time.

In an embodiment, a snapshot created on the storage system comprises a plurality of database blocks representing information stored in the source database at a point in time. The storage system may provision virtual databases based on the database blocks of the source database stored on the storage system. A database block of a point-in-time copy of the source database stored on the storage system may be shared across multiple virtual databases.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. A database may be implemented using a database model, for example, a relational model, object model, hierarchical model or network model. The term "production database" is used in particular examples to illustrate a useful application of the technology; however, it can be appreciated that the techniques disclosed can be used for any database, regardless of whether the database is used as a production database. A production database is also referred to as a source database in this disclosure. Furthermore, embodiments can create a virtual database using storage level snapshots of production databases or clones of production databases instead of a live production database. The virtual databases are "virtual" in the sense that the physical implementation of the database files is decoupled from the logical use of the database files by a database server. Virtual databases are described in U.S. patent application Ser. No. 12/603,541 filed on Oct. 21, 2009, and issued as U.S. Pat. No. 8,150,808, each of which is incorporated by reference herein in its entirety.

In one embodiment, information describing the production database is copied to a database storage system at various times, such as periodically. The information describing the production database may be database blocks or transaction logs. A virtual database created for a point in time is stored as a set of files that contain the information of the database as available at that point in time. Each file includes data structures for referring to the database blocks. The files corresponding to the virtual database are made available to the database server using a file sharing mechanism, which links the virtual database to the appropriate database blocks stored on the storage system. The process of making the virtual database available to a database server is called "provisioning" the virtual database. In some embodiments, provisioning the virtual database includes managing the process of creating a running database server based on virtual database. The database server on which a virtual database has been provisioned can then read from and write to the files stored on the storage system. A database block may be shared between different files, each file associated with a different virtual database. In particular, a database block is shared if the corresponding virtual database systems 130 are only reading the information in the database block and not writing to the database block.

Database provided by certain vendors provide application programming interfaces (APIs) to retrieve changed database blocks of the production database since a previous point in time, for example ORACLE. The database storage system can retrieve the changed database blocks since a previous time and store them in the database storage system. However other vendors of database may not support an API that allows an external system to retrieve the changed database blocks since a point in time, for example, certain releases of MICROSOFT's SQL SERVER. For production databases provided by these vendors, embodiments of the invention allow retrieving information of the production system and storing the information in the database storage system. However, embodiments of the invention disclosed can be used for retrieving information from databases provided by any vendor.

According to an embodiment, the database storage system initially receives a full copy of the production database, for example, by performing a full backup of the production database to the database storage system. Retrieving a full copy of the production database can be a slow process since all database blocks of the production system are copied and stored on the database storage system. Once the full copy of the production database is received, the database storage system receives transaction logs corresponding to transactions executed in the production database since a previous point in time, for example, on a periodic basis. The database storage system applies the retrieved transaction logs to the database blocks of the production database stored on the database storage system. As a result, the information stored in the database storage system tracks the information stored in the production database without having to explicitly copy database blocks from the production database.

However, not all changes in the production database may be available in the transaction logs generated by the production database. For example, if there is a bulk update, insert, or delete operation that affects a large number of rows, a system administrator may turn off logging during the operation to make the operation efficient. As a result, the transaction logs obtained from the production database do not include information describing these operations. The database storage system is unable to track these changes of the production database by applying the transaction logs of the production system. In an embodiment, the database storage system retrieves a full backup of the source database system and restores the full backup of the source database system. The database storage system subsequently retrieves transaction log backups from the backup server and restores the retrieved transaction log backups. This operation is performed iteratively, for example, based on a predefined schedule, for example, periodically. The database storage system may identify whether transaction logs are missing if it detects a failure in applying the transaction log backups, for example, by observing the return code of an application programming interface (API), or a function, or a command invoked to restore the transaction log backups.

There may be other problems with a transaction logs that may cause the transaction logs to be inadequate, for example, In some embodiments, the database storage system may process the transaction logs to determine whether the transaction logs can be successfully applied to the database blocks or whether there is a problem with the transaction logs, for example, missing logs. For example, the transaction logs of the production system may be associated with a sequence number of consecutive numbers corresponding to transactions executed in the production database system called a log sequence number. If the transaction logs are missing for a particular transaction, database storage system may detect a discontinuity in the log sequence.

The database storage system may determine that the transaction log backups are inadequate by invoking an API of the production system that allows an external system to detect issues with the transaction logs. In some embodiments, the database storage system may detect the issues with the transaction logs by actually retrieving the transaction logs and comparing the sequence numbers of consecutive transaction logs.

If the database storage system detects a problem with the transaction logs, the database storage system retrieves a full copy of the production database system. Retrieving a full copy of the production database system is a slow process and also requires a significant storage space in the database storage system for storing the full copy. As a result, embodiments make the process of retrieving and storing the database blocks of the production database efficient by comparing database blocks from the production database with previously stored database blocks in the storage system. If a database block of the production system matches a corresponding database block previously stored in the database storage system, the database storage system does not store the database block in the database storage system or may not even retrieve the database block from the production database. However, if a database block of the production system does not matches a corresponding database block previously stored in the database storage system, the database storage system retrieves the database block from the production database and stores it in the database storage system. Two database blocks may be compared by comparing a hash value, for example, a checksum of each database block. In an embodiment, the database storage system retrieves each database block of the production database and determines whether to save the database block based on comparison of the checksum values. In another embodiment, the database storage system sends a checksum value of a database block to the production database to determine whether the database block even needs to be retrieved from the production database.

Overall System Environment

Figure 1:
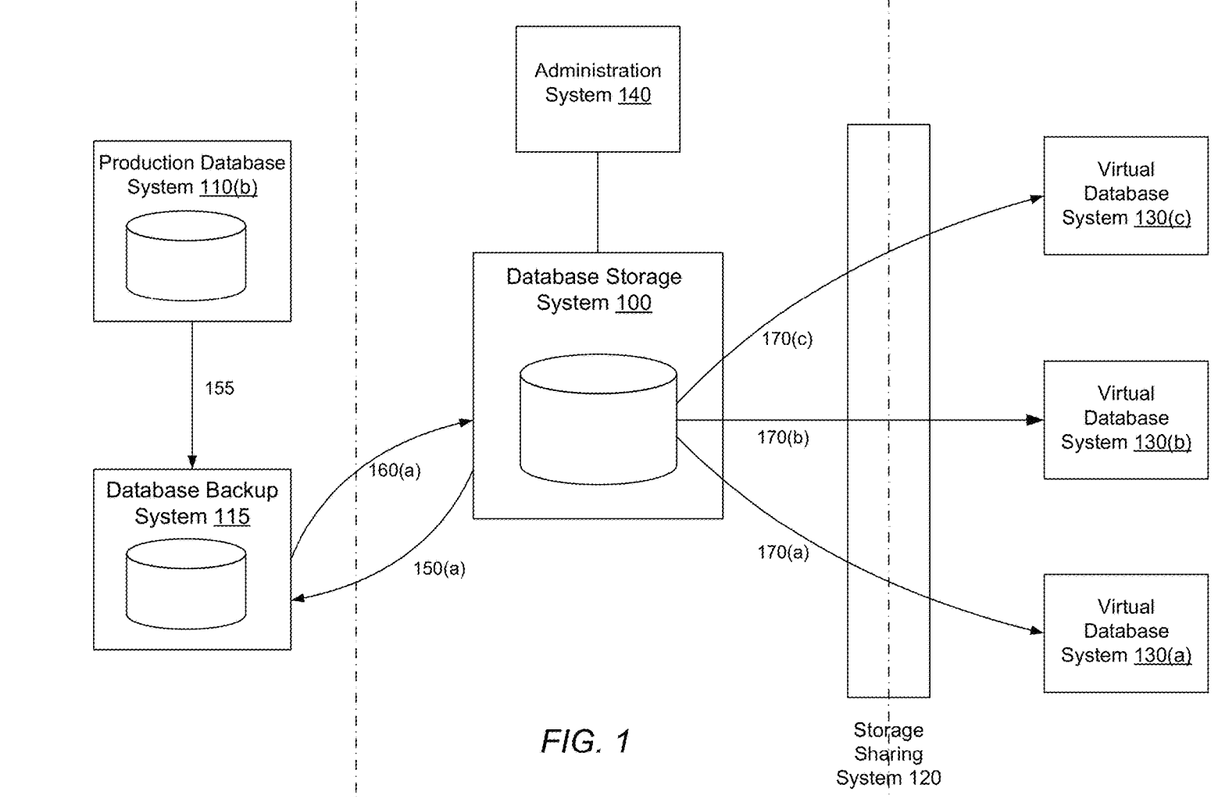
FIG. 1 is diagram illustrating how information is copied from a production database to a database storage system and provisioned as virtual databases using a file sharing system, in accordance with an embodiment of the invention.

FIG. 1 illustrates an embodiment for how information may be copied from a production database to a database storage system and provisioned as virtual databases using a file sharing system. The production database systems 110 manage data for an organization. In some embodiments information may be copied from storage level snapshots of production databases or clones of production databases instead of a live production database. The database storage system 100 retrieves data associated with databases from one or more production database systems 110 and stores the data in an efficient manner, further described below.

In response to a request from the administrator system 140, or based on a predefined schedule, the database storage system 100 may send a request 150 for data to a database backup system 115 that performs backups 155 for the production database system 110. The database backup system 115 responds by sending backup information. The request 150 is sent periodically and the database backup system 115 responds by sending information representing the requested data, for example, the full backup or transaction log backups. The database storage system 100 receives the data 160 sent by the database backup system 115. The database storage system restores the full backup to obtain a copy of the source database (the production database). The database storage system restores the transaction log backups to apply the transaction logs to the restored database. The database storage system tracks the modifications of the source database by applying the transaction logs of the source database to the local copy of the source database obtained by restoring the full backup. The database storage system periodically obtains the transaction log backups and applies them to the locally stored copy of the source database so as to keep track of the changes in the source database (production database). By obtaining the information regarding the source database from the database backup system, the database storage system does not introduce any additional load on the production database system. Typically, production database systems are configured with a database backup system that performs backup for the source database. Since the database backup system is already preconfigured, the introduction of the database storage system does not add any additional load to the production database system. The database storage system 100 stores the information efficiently, for example, by keeping versions of database blocks that have changed and reusing database blocks that have not changed.

To create a virtual database, the database storage system 100 creates files that represent the information corresponding to the production database system 110 at a given point in time. The database storage system 100 exposes 170 the corresponding files to a virtual database system 130 using a storage sharing system 120 (the storage sharing system can also be called a file sharing system). The virtual database system 130 runs a database server that can operate with the files exposed 170 by the database storage system 100. Hence, a virtual copy of the production database is created for the virtual database system 130 for a given point in time in a storage efficient manner.

System Architecture

Figure 2:
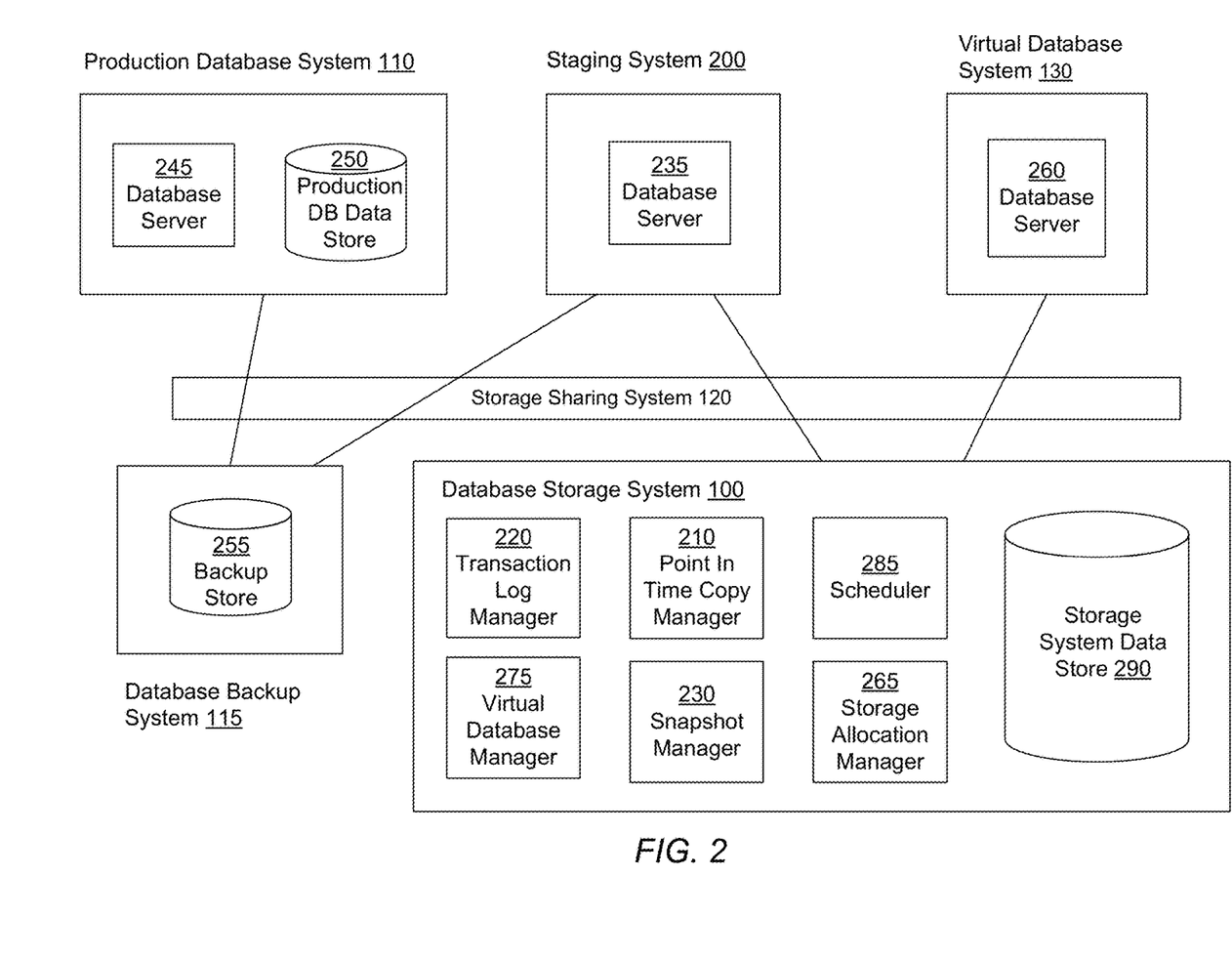
FIG. 2 is a schematic diagram of the architecture of a system that makes storage efficient copies of information from a production database and provisions virtual databases, in accordance with an embodiment of the invention.

FIG. 2 is a schematic diagram of the architecture of a system that makes storage efficient copies of information from a production database and provisions virtual databases, in accordance with an embodiment of the invention. The system comprises one or more production database systems 110, a database backup system 115 (also referred to herein as a backup server), a database storage system 100, a staging system 200, a storage sharing system 120, and one or more virtual database systems 130. Systems shown in FIG. 2 can communicate with each other if necessary via a network.

The storage sharing system 120 allows files stored in a computer system to be accessed by another computer system. For example, files stored in the storage system data store 290 may be shared across computers that are connected with the database storage system 100 over the network. An example of a system for sharing files is a network file system (NFS). A system for sharing files may utilize fiber channel Storage area networks (FC-SAN) or network attached storage (NAS) or combinations and variations thereof. The system for sharing files may be based on small computer system interface (SCSI) protocol, internet small computer system interface (iSCSI) protocol, fiber channel protocols or other similar and related protocols. In an embodiment, files are organized in a format emulating a given file system disk layout, such as the file system of WINDOWS operating system called NTFS or the UNIX file system (UFS).

A production database system 110 is typically used by an organization for maintaining its daily transactions. For example, an online bookstore may save all the ongoing transactions related to book purchases, book returns, or inventory control in a production system 110. The production system 110 includes a database server 245 and a production DB data store 250. In alternative configurations, different and/or additional modules can be included in a production database system 110.

The production DB data store 250 stores data associated with a database that may represent for example, information representing daily transactions of an enterprise. The database server 245 is a computer program that provides database services and application programming interfaces (APIs) for managing data stored on the production DB data store 250. Mounting the production DB data store 250 on the database storage system 100 allows transfer of information stored on the production database system 110 to the database storage system 100.

The production database system 110 may be configured to back up data stored in the production DB data store 250 to the backup store 255 of the database backup system 115. The database backup system 115 may store the information of a database in a backup format. Data stored in the backup format may be restored to obtain information in a database format that can be readily processed by the database server 245 or 235. The production database system 110 periodically sends transaction log backups of the database stored in the production DB data store 250 to the database backup system 115. The transaction log backups may be stored in the database backup system 115 in a backup format and can be restored to a transaction log format that can be readily processed by a database server 245 or 23. The database storage system 100 obtains transaction backups from the database backup system 115 instead of obtaining them from the production database system 110. This reduces the load on the production database system 110 as compared to a configuration in which the production database system 110 provides the transaction log backups to the database storage system 100. For database systems provided by certain vendors, the transaction logs of the production database system 110 get truncated at the production database system as soon as their information is transferred to the database backup system 115. For these database systems, the database storage system 100 is unable to get the transaction logs from the production database system 110 since the information is not available there. This is another reason why the database storage system 100 gets the transaction logs from the database backup system 115.

The data stored in the storage system data store 290 can be exposed to a virtual database system 130 allowing the virtual database system 130 to treat the data as a copy of the production database stored in the production database system 110. The database storage system 100 includes a point-in-time copy manager 210, a transaction log manager 220, a storage allocation manager 265, a scheduler 285, a virtual database manager 275, a snapshot manager 230, and a storage system data store 290. In alternative configurations, different and/or additional modules can be included in the database storage system 100. The files stored in the storage system data store 290 may be shared using the storage sharing system 120 to allow a remote computer, for example, the virtual database systems 130 to access the data in the shared file. A remote system may be able to read and write from/to the file shared by the storage system data store 290.

In an embodiment, the database storage system 100 executes an operating system that is different from the operating system of the production database system 110. For example, the database storage system 100 may execute UNIX or LINUX operating system whereas the production database system 110 executes WINDOWS operating system. As a result, the data of the production database may be stored in a file system format that may not be readily processed by the database storage system 100. In these configurations, a staging system 200 is used to process the data stored in the database storage system 100 if an operation requires the data stored in database storage system 100 needs to be processed in particular ways, for example, for applying transaction logs to the data of the production database stored in the database storage system 100. The staging system 200 may access data stored in the backup store 255 and the storage system data store 290 using the storage sharing system (or file sharing system). For example, the data stored in the backup store 255 and the storage system data store 290 may be mounted on the staging system 200 as a file system. The staging system 200 may read transaction logs in the backup format from the backup store 255 and restore them to the database format and store them on the storage system data store 290. The staging system 200 may also apply the transaction logs to the copy of the production database stored on the storage system data store 290.

The staging system 200 can be selected by the database storage system 100 from a pool of suitable systems managed by the database storage system 100. The pool of potential stagings systems may consist of multiple hosts, each containing one or more instances of database systems with varying characteristics. These may include a variety of operating system and database system software versions. The hosts could have differing communication characteristics for communicating with other hosts, for example, hosts residing on different network systems, having different communication performance characteristics (for example, based on geographic location).

For any given transaction log backup restoration operation, a staging system could be selected by the database storage system from the pool of available systems based on a number of characteristics. These include but are not limited to CPU/memory load on a given host, network connectivity between the backup server and the staging system, operating system/database version constraints between the staging system and versioning of the production database system being restored, geographical location (or distance) between the backup system and the staging system, user provided policy constraints, historical performance characteristics of staging hosts with respect to database restore operations.

A database system may implement a transaction logging mode whereby all transactions are logged to allow the database to be restored to a fully consistent state for crash recovery. However the database system discards transaction log data once the database storage enters a consistent state. For example, database offered by vendor MICROSOFT, i.e., SQL SERVER has such a mode termed "SIMPLE recovery model". If such a database system feature exists, database administrators may use this mode in order to minimize the management of space consumed by transaction log data. Such database systems may also implement a transaction logging mode whereby all transaction log data is retained until database administrator intervention is taken in the form of actions to backup the transaction log data. For example, SQL SERVER has such a mode termed "FULL recovery model". In this case the database administrator could delegate responsibility for managing the space usage of the database system log data to the database storage system 100.

In an embodiment, the database storage system changes the recovery model of the database system to a mode where all transaction log data is retained until action is taken to backup the log data. The database storage system then deletes transaction log backups once the log files have been applied on a staging system. The database storage system may also take emergency action if it determines that the process of restoring data on the staging system cannot keep pace with the log generation rate on the production system. Such action could include but is not limited to notifying the administrator that additional storage space is required, changing the recovery model of the production database back to a mode where transaction log data is retained only so long as the database storage remains in an inconsistent state.

The point-in-time copy manager 210 interacts with the production database system 110 by sending a request to retrieve information representing a point-in-time copy (also referred to as a "PIT copy") of a database stored in the production DB data store 250. The point-in-time copy manager 210 stores the data obtained from the production database system 110 in the storage system data store 290. The data retrieved by the point-in-time copy manager 210 corresponds to database blocks (or pages) of the database being copied from the production DB data store 250. After a first PIT copy request to retrieve information production DB data store 250, a subsequent PIT copy request may store only the data that changed in the production database since the previous request. The data collected in the first request can be combined with the data collected in a second request to reconstruct a copy of the database corresponding to a point in time at which the data was retrieved from the production DB data store 250 for the second request.

Some vendors of database systems provide application programming interfaces (APIs) that allow an external system such as the database storage system 100 to retrieve only the changed database blocks since the last time database blocks were retrieved from the source database. However other database vendors may not provide an equivalent functionality. Instead, these database vendors support retrieval of a copy of all the database blocks of the source database. Retrieving and storing an entire copy of the production database in the storage system data store 290 may require significant time to copy the data and large storage space.

The point-in-time copy manager 210 makes a copy of the source database such that only the changed database blocks of the production database are stored in the storage system data store 290. In an embodiment, the database storage system 100 stores a hash value corresponding to each database block stored in the database storage system 100. The hash value can be a checksum based on the data stored in the database block. The checksum value is determined using a method that ensures that different checksum value is obtained for any two database blocks that store different data. As a result, if the checksum value corresponding to two database blocks is identical, the two database blocks can be determined as storing identical data with a very high probability. The ability to determine whether the two database blocks store identical data by comparing checksum values corresponding to two database blocks to allows for efficient comparison between the two database blocks since checksum values can be represented using significantly fewer bits than a database block. As a result significantly fewer bits need to be compared determine whether the two database blocks store identical data. Although there is a very small probability that two database blocks storing different data can correspond to the same checksum value, that probability is so small that it is considered statistically insignificant.

The point-in-time copy manager 210 uses the checksum values stored for the database blocks to compare database blocks of a received copy of a database to determine which database blocks are different from the saved copy. Accordingly, the point-in-time copy manager 210 saves only the database blocks that are different from the database blocks available in the copy of the database previously stored in the database storage system. For database blocks that store same information as the corresponding database block previously stored in the database storage system, a pointer to the previously stored database may be used instead of storing a new copy of the database block.

The transaction log manager 220 sends request to the production database system 110 for retrieving portions of the transaction logs stored in the production database system 110. In some embodiments, the request from the transaction log manager 220 is sent to the vendor interface module 335. The data obtained by the transaction log manager 220 from the vendor interface module 335 is stored in the storage system data store 290. In one embodiment, a request for transaction logs retrieves only the changes in the transaction logs in the production database system 110 since a previous request for the transaction logs was processed. The database blocks retrieved by a point in time copy manager 210 combined with the transaction logs retrieved by the transaction log manager 220 can be used to reconstruct a copy of a database in the production system 110 corresponding to previous points in time.

The snapshot manager 230 creates snapshots of databases stored in the storage system data store 290. A snapshot of a database comprises data structures that represent database blocks of the database. If a previous copy of the database is stored in the storage system data store 290, the structures of the snapshot may point at the database blocks of the previous copy. For example, if a database block of the current copy is identical to the corresponding database block of the previous copy, the database snapshot corresponding to the current copy may store a pointer to the database block of the previous copy. However, if the database block of the current copy was updated and stores different data compared to the corresponding database block of the previous copy, the actual data of the database block is stored in the snapshot storing the current copy.

The storage allocation manager 265 allocates storage in the storage system data store 290 for storing database blocks and stores them. For example, the point-in-time copy manager 210 may call APIs of storage allocation manager to save blocks of data retrieved from the production database system 110. In an embodiment, the storage allocation manager 265 receives a database block for storing in the storage system data store 290 and determines whether it needs to store the database block. For example, the storage allocation manager 265 may compare the received database block with the corresponding database block stored in the storage system data store 290 to determine whether the received database blocks is different from the previously stored database block. If the storage allocation manager 265 determines that the received database block is identical to the corresponding database block stored in the storage system data store 290, the storage allocation manager 265 does not store the received copy of the database block. Instead, the storage allocation manager 265 may store information indicating that the database block of the received point-in-time copy is identical to the database block of the previously stored point-in-time copy. In an embodiment, the storage allocation manager 265 may store a pointer to the previously stored database block instead of the received database block indicating that the corresponding information can be obtained from the previously stored database block. If an attempt is made to write to the database block, the storage allocation manager 265 creates a copy of the database block since the database block is shared between more than one point-in-time copies of the database.

The scheduler 285 schedules various operations of the database storage system 100. A system administrator can specify that the transaction logs of the source database are retrieved based on a predetermined schedule. The scheduler 285 causes the transaction log manager 220 to wait for a time interval between two subsequent retrievals of the transaction logs. Similarly, a system administrator can specify a schedule for creating a database snapshot based on the latest point-in-time copy of the source database that is stored in the storage system data store 290.

The virtual database manager 275 receives requests for creation of a virtual database for a virtual database system 130. The request for creation of a virtual database may be sent by a database administrator and identifies a production database system 110, a virtual database system 130, and includes a past point-in-time corresponding to which a virtual database needs to be created. The virtual database manager 275 creates the necessary files corresponding to the virtual database being created and shares the files with the virtual database system 130. The database administrator for a virtual database system 130 may be different from a database administrator for the production database system 110.

A virtual database system 130 includes a database server 260. The database server 260 is similar in functionality to the database server 245 and is a computer program that provides database services and application programming interfaces (APIs) for managing data stored on a data store 250. The data managed by the database server 260 may be stored on the storage system data store 290 that is shared by the database storage system 100 using a file sharing system 120. In alternative configurations, different and/or additional modules can be included in a virtual database system 130.

It should also be appreciated that in practice at least some of the components of the database storage system 100 may be distributed over multiple computers, communicating over a network. For convenience of explanation, however, the components of the database storage system 100 are discussed as though they were implemented on a single computer. In another embodiment, certain components may be located on a separate system that is coupled to the database storage system 100 by a network. The database storage system 100 may also include one or more input/output devices that allow data to be input and output to and from the system. It will be understood that embodiments of the database storage system 100 also include standard software and hardware components such as operating systems and the like and further include standard hardware components (e.g., network interfaces, storage devices, etc.) not shown in the figure for clarity of example.

Retrieving Point-in-Time Copies of Source Database

Figure 3:
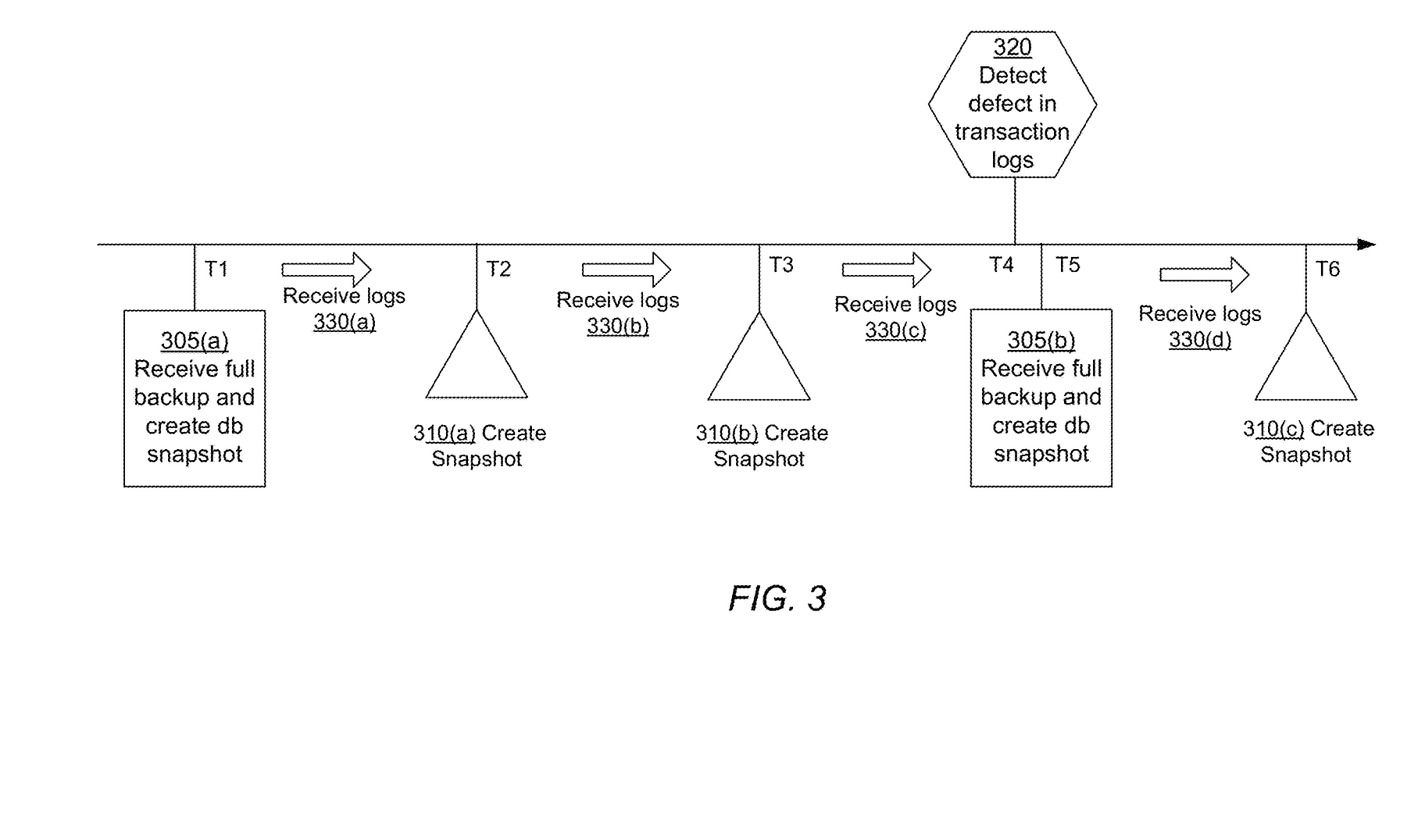
FIG. 3 shows a time line illustrating the steps for creating snapshots of a database based on transaction logs received from the production database, in accordance with an embodiment of the invention.

FIG. 3 shows a time line illustrating the steps for creating snapshots of a database based on transaction logs received from the production database, in accordance with an embodiment of the invention. The point-in-time copy manager 210 receives 305(*a*) a copy of the source database at time T1. In an embodiment, the point-in-time copy manager 210 performs a full-backup of the source database in order to receive the copy of the source database. The full-backup of the source database may comprise entire data stored in the source database. In an embodiment, the information of the source database is represented in a backup format in the full-backup of the source database. The information stored in the backup format may be converted to a standard database format by performing a restore of the backup information. In some embodiments, the backups of the production database may be performed by using a software from a third party that is different from the vendor providing the production database system. In these embodiments, the database storage system extracts the backup information in the native format of the third party system and stores it. The database storage system may invoke a library associated with the third party system to restore the backup information, for example, restore a full backup or restore transaction log backups. The database blocks that have been converted to the standard database format can be read and processed, for example, by a query processor of a database system. The amount of information stored in the source database can be large and receiving a full backup of the source database can be a slow operation. Furthermore, the amount of storage required to store the full backup of the source database also can be significant since each full-backup may require as much storage space as the source database. The database storage system 100 stores all the database blocks of the first copy of the source database obtained as a full backup of the source database. However, the database storage system 100 determines only the changed database blocks of subsequent copies of source database so as to store the subsequent copies efficiently. The snapshot manager 230 also creates 305*a* a snapshot based on the received database blocks from the source database.

Subsequent to receiving 305(*a*) the copy of the source database, the transaction log manager 220 receives 330(*a*), 330(*b*), 330(*c*) transaction logs of the source database. For source databases provided by certain vendors, the transaction logs can be retrieved from the source database in the format of transaction logs whereas for some vendors the transaction logs may be retrieved in a backup format. The transaction log format can be directly processed by a database server, for example, while applying the transaction logs to database blocks to compute updated database blocks. Transaction logs obtained in backup format are converted to the transaction log format before the transaction logs can be applied to the database blocks. If the transaction logs are retrieved in backup format, the transaction log manager 220 applies a restore operation to the information received to convert the format to the transaction log format. The transaction log manager may invoke the staging system 200 for restoring the transaction logs from the backup format.

The transaction logs may be received 330 based on a predetermined schedule, for example, periodically. In an embodiment, the transaction logs may be received 330 in response to a command from a system administrator. Alternatively, the transaction logs may be received as a combination of predetermined schedule and commands from system administrator. The transaction log manager 220 applies the received transaction logs to the latest point-in-time copy of the source database. Some database blocks of the point-in-time copy may get updated as a result of applying the transaction logs. Subsequent transaction logs are applied to the updated database blocks of the point-in-time copy if applicable. The rate at which the transaction logs are applied may be different from the rate at which the transaction logs are received. For example, the transaction logs may be received every five minutes but applied to the database blocks every hour.

The snapshot manager 230 creates snapshots of the point-in-time copy of the database as it get updated using the transaction logs at various time points including T2 and T3. The snapshot manager 230 may create snapshots on a predetermined schedule or based on a command executed by a system administrator. The snapshots may be created at a rate different from the rate at which transactions are received or applied to the database blocks. For example, transaction logs may be received every 5 minutes, transaction logs applied to the point-in-time copy every 15 minutes, and snapshots created based on the updated point-in-time copy every hour.

The transaction log manager 220 detects 320 whether there is a defect in transaction logs received at time T4 (a defect in transaction logs herein refers to transaction logs that cannot be processed as well as missing transaction logs, for example due to corruption in transaction logs, transaction logs that may get deleted, transaction logs missing/corrupted due to a bug/defect in the source database software or the backup software, transaction logs missing because a system administrator updated the database settings to not log certain types of operations, or other reasons.). The defect in the transaction logs may be caused due to lack of information at the source database. For example, a database administrator may turn off logging for a table before performing an update operation. Database administrators may turn off logging for example, if a bulk insert, update, or delete operation is performed that affects a large number of rows of a table. Turning off logs may increase the efficiency of the operations performed since the database does not spend time creating the logs. However, the transaction logs for these operations are missing and the database storage system 100 does not obtain the information required to update the point-in-time copy to the same state as the source database by receiving 330 the transaction logs. The database storage system 100 does not obtain the required information because the information was not stored in the logs at the source database. The transaction log manager may determine that there is such a defect in the logs by invoking an API of the source database. Certain vendors provide APIs that enable an external system to interact with a database system to determine whether the transaction logs are complete or the transaction logs are missing information. In some embodiments, the defect caused by missing logs for certain tables can be accounted for by other mechanisms. For example, the transaction logs corresponding to all other tables can be restored. Any virtual database created based on this information can be used for queries that only retrieve information from remaining tables (other than the tables for which information is missing from the transaction logs). Furthermore, certain vendors provide the APIs or commands to retrieve a cumulative incremental backup since a previous full backup was taken that includes all the changed blocks since the full backup was taken. The cumulative incremental backup can be used to restore the local copy of the source database to a state corresponding to the point in time when the cumulative incremental backup was taken. However, the local copy of the source database may not be fully restored to states that occurred in between the time period that the defect in the transaction logs started and the time period that the cumulative incremental backup was taken.

In an embodiment, each transaction log includes a sequence number that keeps monotonically increasing as new transaction logs are added. The transaction logs of two operations that were executed consecutively differ by one. If two consecutive transaction logs differ by a value that is greater than one, the transaction log manager determines that there are missing transaction logs and therefore there is a defect in the transaction logs.

The transaction log manager 220 may also detect corruption in the log that may happen during the process of transfer of logs or before or after the logs are transferred to the database storage system 100. For example, the transaction logs may be corrupted due to corruption of the file storing the transaction logs or due to a bug or defect in the software processing the transaction logs. In some embodiments, the database storage system 100 may determine that the transaction logs are corrupt by applying the transaction logs to the point-in-time copy of the source database. For example, the process of applying the transaction logs to the point-in-time copy of the source database may fail and return an error if the transaction logs are corrupted. In some cases, the process of applying the transaction logs to the point-in-time copy of the source database may succeed, however the resulting database may indicate a problem with the database caused by applying the transaction logs. These various examples of corruption of logs or missing logs are detected 320 by the transaction log manager 220.

If the transaction log manager 220 detects 320 a defect in transaction logs, the point-in-time copy manager 210 receives 305(b) a complete copy of the source database at time point T4. The snapshot manager 230 creates 305(b) a snapshot based on the database blocks of the source database received 305(b). The database storage system 100 copies the complete source database in a situation where the database storage system 100 is unable to track the source database by applying the transaction logs to a point-in-time copy. Since the database storage system 100 already has a previous point-in-time copy of the source database, the database storage system 100 performs the subsequent copy of the source database in an efficient manner, for example, by storing only the changed database blocks. The transaction log manager 220 continues to receive 330(d) the transaction logs from the source database and apply the transaction logs to the latest point-in-time copy of the source database. The snapshot manager also continues to create 310(c) snapshots of the source database, for example, at time T6.

Figure 4:
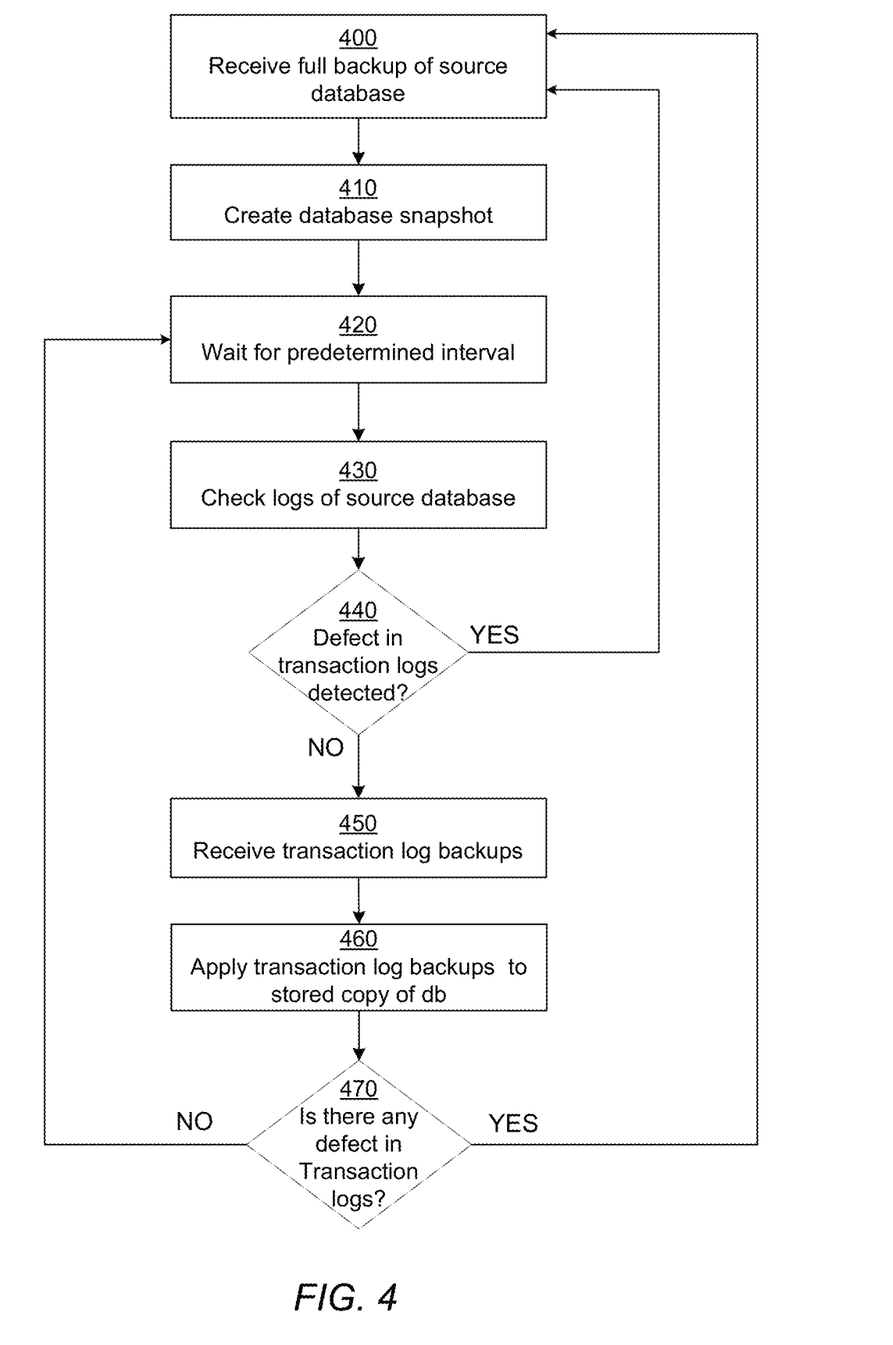
FIG. 4 is a flowchart of the process for creating snapshots of a database based on transaction logs received from the production database, in accordance with an embodiment of the invention.

FIG. 4 is a flowchart of the process for creating snapshots of a database based on transaction logs received from the production database, in accordance with an embodiment of the invention. As illustrated in FIG. 4, transaction logs from the source database are received and applied to database blocks previously copied from the source database until a defect in transaction logs is detected. If a defect in transaction logs is detected, a new full backup of the source database is received.

The point-in-time copy manager 210 receives 410 a copy of the source database, for example, by performing a full backup of the source database. The snapshot manager 230 creates 410 a database snapshot based on the point-in-time copy. The scheduler 265 causes the transaction log manager 220 to wait 420 for a time interval based on a predefined schedule for retrieving transaction logs of the source database. The transaction log manager 220 checks 430 the transaction logs of the source database to determine whether there is a defect in transaction logs. For example, the transaction log manager 220 may invoke an API of the source database to determine if there is a defect in the transaction logs.

If the transaction log manager 220 determines 440 that there is no defect in the transaction logs, the transaction log manager 220 receives 450 the transaction logs. The transaction log manager 220 applies the transaction logs to the latest point-in-time copy of the source database to update the database blocks stored in the storage system data store 290. The snapshot manager 230 may create a database snapshot based on the updated database blocks. If the transaction log manager 220 determines 470 that there is a defect in the transaction logs, the transaction log manager 220 invokes the point-in-time copy manager 210 to retrieve a full copy of the source database. In an embodiment, the rates at which the transaction logs are received 450, the rate at which transaction logs are applied 460 and/or the rate at which the database snapshots are created 470 can be different. The transaction log manager 220 checks 480 if there was a failure in applying the transaction logs, for example, whether the operation of applying the transaction logs failed or whether the updated database blocks indicate that there was a failure in applying the transaction logs. If transaction log manager 220 does not detect 480 any failure in applying the transaction logs, the database storage system 100 repeats the above steps of waiting 420, checking 430 logs of source database, detecting 440 if there is a defect in transaction logs, receiving 450 transaction logs, applying 460 the transaction logs, and creating 470 the database snapshot. If transaction log manager 220 detects 480 a failure in applying the transaction logs, the point-in-time copy manager 210 receives 400 a copy of the source database and repeats the above steps.

Figure 5:
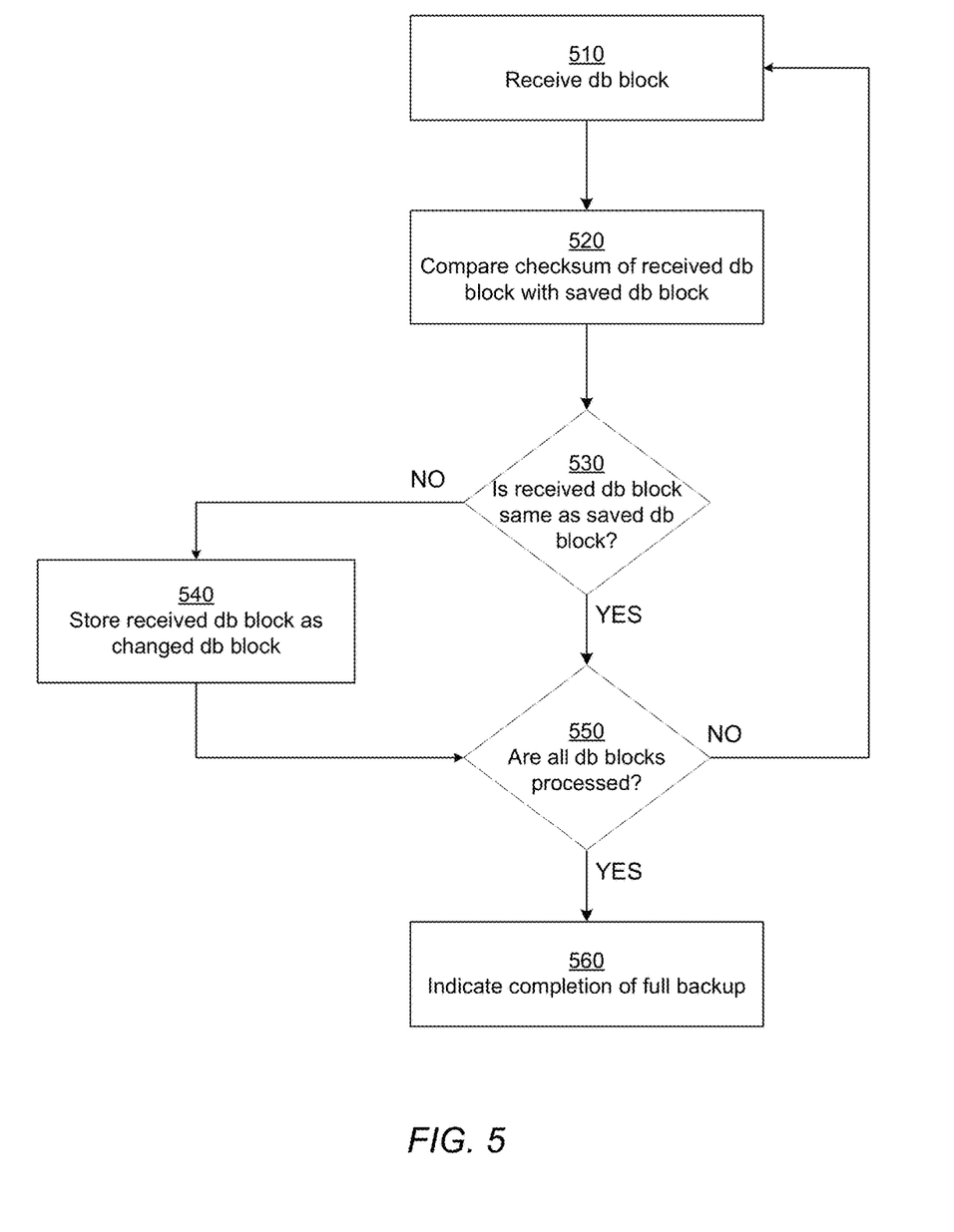
FIG. 5 is a flowchart of the process for efficiently receiving a point-in-time copy of a database, in accordance with an embodiment of the invention.

FIG. 5 is a flowchart of the process for efficiently receiving a point-in-time copy of a database, in accordance with an embodiment of the invention. Since a full copy of the source database is received when a defect in transaction logs is detected 440, the database storage system 100 retrieves and stores the copy in a manner that is efficient in terms of time of execution and/or space required. If entire copies of the source database received by the database storage system 100 are stored in the storage system data store 290, the amount of data stored in the storage system data store 290 can be as large as N×S where N copies are stored and S is the average size of a copy of the source database. Therefore, the database storage system 100 executes the process illustrated in FIG. 5 to efficiently store copies of the source database.

The point-in-time copy manager 210 receives several database blocks of the source database and stores them. For each database block of the source database that is received, the database storage system 100 performs the following steps. The point-in-time copy manager 210 receives 510 the database block. The point-in-time copy manager passes the database block to the storage allocation manager 265 for storing. The storage allocation manager 265 compares 520 a checksum value of the received database block with a corresponding saved database block from a previous point-in-time copy. If storage allocation manager 265 determines 530 that the two database blocks have different checksum values, the storage allocation manager 265 stores 540 the received database block as a changed database block. If storage allocation manager 265 determines 530 that the two database blocks have identical checksum values, the storage allocation manager 265 does not store the received database block. The point-in-time copy manager 210 checks 550 whether all database blocks of the new copy of the source database being received have been processed. If the point-in-time copy manager 210 determines that all database blocks of the new copy of the source database being received have been processed, the point-in-time copy manager indicates completion of the process of copying the source database. If the point-in-time copy manager 210 determines that all database blocks of the new copy of the source database being received have not been processed, the point-in-time copy manager 210 repeats the steps 510, 520, 530, 540, and 550 of the process illustrated in FIG. 5.

In an embodiment, the point-in-time copy manager 210 receives the database blocks from a source server, for example, the database backup system 115. The point-in-time copy manager 210 sends the checksum value of a database block to the source server. The source server compares the received checksum value with a checksum value of the corresponding database block to determine whether the database block needs to be communicated to the database storage system 100. If the source server determines that the two checksums are different, the source server sends the database block to the database storage system 100. If the source server determines that the two checksums are identical, the source server does not send the database block to the database storage system and may instead send information indicating that the two database blocks are identical. In this embodiment, the amount of data transferred between the source server and the database storage system 100 is less compared to an embodiment that transfers the entire copy to the database storage system before comparing the database blocks.

In another embodiment, the production database system 110 is configured to perform periodic backups of the source database. The production database system 110 may use the database storage system 100 to store backups of the source database. Accordingly, the database storage system 100 receives the copy of the source database without having to make an additional request. However, the database storage system 100 may not retain every copy of the source database received. The database storage system 100 may use the process illustrated in FIG. 5 to store only the changed database blocks of the copy of the source database received and either discard the complete copy of the source database or overwrite the space used for the copy with subsequent copies of the source database.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for storing copies of databases in a storage system, the method comprising:
   maintaining, by a storage system, a plurality of copies of a source database on a storage system, each copy including a plurality of database blocks received by the storage system from a production database system, the plurality of database blocks representing the source database at a point in time, wherein one or more database blocks are associated with at least two copies, and wherein the source database is a relational database, the maintaining comprising:
   receiving, by the storage system from the production database system, transaction logs of the source database;
   determining, by the storage system, that the transaction logs of the source database are defective by:
      determining that at least one transaction log is missing responsive to determining that sequence numbers of two consecutive transaction logs of the transaction logs differ by a value greater than one,
      applying the transaction logs to a copy of the source database, and
      determining that the transactions are corrupted responsive to receiving an indication of failure to process the transaction logs as result of applying the transaction logs to the copy of the source database;
   responsive to determining that the transaction logs are defective, receiving, by the storage system from the production database system, a latest copy of data from the source database comprising a plurality of database blocks, and for one or more database blocks received in the latest copy:
      determining, by the storage system, that the database block of the latest copy fails to match a corresponding database block of a previously stored copy of the source database, and
      responsive to determining that the database block from the latest copy fails to match the corresponding database block of the previously stored copy of the source database, storing, by the storage system, the database block of the latest copy on the storage system; and
   creating, by the storage system, a snapshot on the storage system representing the latest copy of the source database.

2. The method of claim 1, wherein matching the database block of the latest copy with the database block of the previously stored copy comprises comparing a hash value based on the database block of the latest copy with a hash value of the corresponding database block of the previously stored copy.

3. The method of claim 1, wherein the snapshot comprises a plurality of database blocks representing information stored in the source database at a point in time.

4. The method of claim 3, wherein the plurality of database blocks associated with the snapshot comprises one or more database blocks to which the transaction logs of the source database are applied.

5. The method of claim 1, further comprising:
   responsive to receiving a request to provision a virtual database corresponding to a point in time, returning a file structure identifying database blocks comprising at least a first database block to which a first set of transaction logs is applied and second database block to which a second set of transaction logs is applied, the first and second sets of transaction logs received at different points in time.

6. The method of claim 1, wherein determining whether the transaction logs of the source database are defective comprises:
   sending a request to the source database to determine whether the transaction logs are defective; and
   receiving a response from the source database indicating whether the transaction logs are defective.

7. The method of claim 1, wherein the plurality of database blocks in the latest copy of the source database includes database blocks of the source database that changed since the previously stored copy of the source database was obtained as well as database blocks that did not change since the previously stored copy of the source database was obtained.

8. The method of claim 1, wherein receiving the latest copy of the source database comprises taking a full backup of the source database and restoring database blocks of the source database from the full backup.

9. The method of claim 1, wherein the transaction logs of the source database are received from a backup server configured to store a copy of the source database and receive transaction logs in a backup format from the source database, the method further comprising:
   restoring the transaction logs from the backup format before applying the transaction logs.

10. A non-transitory computer-readable storage medium storing instructions for:
   maintaining, by a storage system, a plurality of copies of a source database on a storage system, each copy including a plurality of database blocks received by the storage system from a production database system, the plurality of database blocks representing the source database at a point in time, wherein one or more database blocks are associated with at least two copies, and wherein the source database is a relational database, the maintaining comprising:
   receiving, by the storage system from the production database system, transaction logs of the source database;
   determining, by the storage system, that the transaction logs of the source database are defective by:
      determining that at least one transaction log is missing responsive to determining that sequence numbers of two consecutive transaction logs of the transaction logs differ by a value greater than one,
      applying the transaction logs to a copy of the source database, and
      determining that the transactions are corrupted responsive to receiving an indication of failure to process the transaction logs as result of applying the transaction logs to the copy of the source database;
   responsive to determining that the transaction logs are defective, receiving, by the storage system from the production database system, a latest copy of data from the source database comprising a plurality of database blocks, and for one or more database blocks received in the latest copy:

determining, by the storage system, that the database block of the latest copy fails to match a corresponding database block of a previously stored copy of the source database, and     responsive to determining that the database block from the latest copy fails to match the corresponding database block of the previously stored copy of the source database, storing, by the storage system, the database block of the latest copy on the storage system; and     creating, by the storage system, a snapshot on the storage system representing the latest copy of the source database.

11. The non-transitory computer readable storage medium of claim 10, further storing instructions for matching the database block of the latest copy with the database block of the previously stored copy by comparing a hash value based on the database block of the latest copy with a hash value of the corresponding database block of the previously stored copy.

12. The non-transitory computer readable storage medium of claim 10, further storing instructions for:

responsive to receiving a request to provision a virtual database corresponding to a point in time, returning a file structure identifying database blocks comprising at least a first database block to which a first set of transaction logs is applied and second database block to which a second set of transaction logs is applied, the first and second sets of transaction logs received at different points in time.

13. The non-transitory computer readable storage medium of claim 10, wherein the transaction logs of the source database are received from a backup server configured to store a copy of the source database and receive transaction logs in a backup format from the source database, the non-transitory computer readable storage medium further storing instructions for:

restoring the transaction logs from the backup format before applying the transaction logs.

14. A computer-implemented system for storing copies of databases in a storage system, the system comprising:

a computer processor; and a non-transitory computer-readable storage medium storing instructions for execution by the computer processor, the instructions causing the computer processor to:

maintain, by a storage system, a plurality of copies of a source database on a storage system, each copy including a plurality of database blocks received by the storage system from a production database system, the plurality of database blocks representing the source database at a point in time, wherein one or more database blocks are associated with at least two copies, and wherein the source database is a relational database, the maintenance comprising:

receive, by the storage system from the production database system, transaction logs of the source database;

determine, by the storage system, that the transaction logs of the source database are defective by:

determining that at least one transaction log is missing responsive to determining that sequence numbers of two consecutive transaction logs of the transaction logs differ by a value greater than one,                 applying the transaction logs to a copy of the source database, and                 determining that the transactions are corrupted responsive to receiving an indication of failure to process the transaction logs as result of applying the transaction logs to the copy of the source database;

responsive to the determination that the transaction logs are defective, receive, by the storage system from the production database system, a latest copy of data from the source database comprising a plurality of database blocks, and             for one or more database blocks received in the latest copy:

determine, by the storage system, that the database block of the latest copy fails to match a corresponding database block of a previously stored copy of the source database, and                 responsive to the determination that the database block from the latest copy fails to match the corresponding database block of the previously stored copy of the source database, store, by the storage system, the database block of the latest copy on the storage system; and             create, by the storage system, a snapshot on the storage system representing the latest copy of the source database.

15. The computer system of claim 14, wherein the instructions further cause the computer processor to match the database block of the latest copy with the database block of the previously stored copy by comparing a hash value based on the database block of the latest copy with a hash value of the corresponding database block of the previously stored copy.

16. The computer system of claim 14, wherein the instructions further cause the computer processor to:

responsive to receiving a request to provision a virtual database corresponding to a point in time, return a file structure identifying database blocks comprising at least a first database block to which a first set of transaction logs is applied and second database block to which a second set of transaction logs is applied, the first and second sets of transaction logs received at different points in time.

\* \* \* \* \*